(12) United States Patent
Al-Majnouni et al.

(10) Patent No.: US 11,396,630 B2
(45) Date of Patent: Jul. 26, 2022

(54) NAPHTHA CATALYTIC CRACKING FOR LIGHT OLEFINS PRODUCTION OVER CYCLIC REGENERATIVE PROCESS WITH DRY GAS DILUENT

(71) Applicant: SABIC Global Technologies B.V., Bergen op Zoom (NL)

(72) Inventors: Khalid A. Al-Majnouni, Riyadh (SA); Talal Alshammari, Riyadh (SA); Nabil Alyasser, Brampton (CA); Ahmed Alzenaidi, Riyadh (SA); Wojciech Supronowicz, Riyadh (SA)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 16/466,570

(22) PCT Filed: Dec. 11, 2017

(86) PCT No.: PCT/IB2017/057797
§ 371 (c)(1),
(2) Date: Jun. 4, 2019

(87) PCT Pub. No.: WO2018/109639
PCT Pub. Date: Jun. 21, 2018

(65) Prior Publication Data
US 2019/0330539 A1    Oct. 31, 2019

Related U.S. Application Data

(60) Provisional application No. 62/433,618, filed on Dec. 13, 2016.

(51) Int. Cl.
*C10G 11/10*    (2006.01)
*B01J 29/40*    (2006.01)
(Continued)

(52) U.S. Cl.
CPC ............. *C10G 11/10* (2013.01); *B01J 29/40* (2013.01); *B01J 35/002* (2013.01);
(Continued)

(58) Field of Classification Search
None
See application file for complete search history.

(56) References Cited

U.S. PATENT DOCUMENTS

| 2,248,118 A | 7/1941 | Pew, Jr. | 196/49 |
| 2,351,154 A | 6/1944 | Schulze | 196/28 |

(Continued)

FOREIGN PATENT DOCUMENTS

| CN | 85106455 A | 3/1987 |
| CN | 100554229 C | 10/2009 |

(Continued)

OTHER PUBLICATIONS

Bulatov et al., "FCC Process of Heavy Feed Stock With Improved Yield of Light Olefins", Oil and Gas Business, 10 pages, 2009.
(Continued)

*Primary Examiner* — Tam M Nguyen
(74) *Attorney, Agent, or Firm* — Norton Rose Fulbright US LLP

(57) ABSTRACT

A method of producing olefins by catalytic cracking of hydrocarbons is disclosed. The method may include catalytic cracking hydrocarbons in a feed stream that includes the hydrocarbons and the dry gas diluent. The catalytic cracking may be carried out in a process using a train of fixed bed reactors while one or more other trains of fixed bed reactors are being regenerated or are on standby after being regenerated. When the train of fixed bed reactors being used needs regenerating, it is taken out of service and the one or more other trains of fixed bed reactors put in service to carry
(Continued)

out the catalytic cracking process. Dry gas instead of steam may be used to reduce the partial pressure of hydrocarbons.

20 Claims, 3 Drawing Sheets

(51) Int. Cl.
*C10G 11/05* (2006.01)
*C10G 11/20* (2006.01)
*B01J 35/00* (2006.01)
*B01J 37/00* (2006.01)
*C10G 47/04* (2006.01)
*C10G 47/16* (2006.01)

(52) U.S. Cl.
CPC .......... *B01J 37/0009* (2013.01); *C10G 11/05* (2013.01); *C10G 11/20* (2013.01); *C10G 47/04* (2013.01); *C10G 47/16* (2013.01); C10G 2300/104 (2013.01); C10G 2300/1044 (2013.01); C10G 2300/1051 (2013.01); C10G 2300/42 (2013.01); C10G 2300/708 (2013.01); C10G 2300/802 (2013.01); C10G 2400/20 (2013.01)

(56) References Cited

U.S. PATENT DOCUMENTS

| | | | |
|---|---|---|---|
| 4,830,728 A | 5/1989 | Herbst et al. | 208/78 |
| 6,791,002 B1 | 9/2004 | Abrevaya et al. | 585/648 |
| 7,232,516 B2* | 6/2007 | Sughure, II | B01J 20/02 |
| | | | 208/134 |
| 7,312,370 B2 | 12/2007 | Pittman et al. | 585/648 |
| 7,531,703 B2* | 5/2009 | Ramesh | C10G 1/10 |
| | | | 585/241 |
| 7,601,254 B2* | 10/2009 | Gosling | C10G 11/05 |
| | | | 208/106 |
| 7,632,977 B2* | 12/2009 | Mo | B01J 8/1809 |
| | | | 208/120.1 |
| 7,875,755 B2 | 1/2011 | Voskoboynikov | 585/324 |
| 8,293,961 B2 | 10/2012 | Choi et al. | 585/651 |
| 8,324,441 B2 | 12/2012 | Wegerer et al. | 585/648 |
| 8,398,955 B2* | 3/2013 | Lai | C10G 45/64 |
| | | | 423/700 |
| 8,883,668 B2* | 11/2014 | Nesterenko | C07C 1/322 |
| | | | 502/60 |
| 8,900,445 B2* | 12/2014 | Xie | C10G 11/14 |
| | | | 208/120.15 |
| 8,975,462 B2* | 3/2015 | Kim | C10G 69/04 |
| | | | 585/323 |
| 2006/0108261 A1* | 5/2006 | Steffens | C07C 4/06 |
| | | | 208/67 |
| 2010/0240937 A1 | 9/2010 | Gartside et al. | 585/315 |
| 2011/0230697 A1* | 9/2011 | Nicholas | C07C 4/06 |
| | | | 585/651 |
| 2011/0308998 A1* | 12/2011 | Nicholas | B01J 29/80 |
| | | | 208/120.15 |
| 2014/0005031 A1* | 1/2014 | Chaumonnot | B01J 37/10 |
| | | | 502/64 |

FOREIGN PATENT DOCUMENTS

| | | |
|---|---|---|
| CN | 102356053 A | 2/2012 |
| EP | 2660228 A1 | 11/2013 |
| WO | WO03/082462 | 10/2003 |
| WO | WO2006/098712 A1 | 9/2006 |
| WO | WO2013/016660 A1 | 1/2013 |

OTHER PUBLICATIONS

International Search Report and Written Opinion for PCT/IB2017/057797 dated Feb. 21, 2018, 9 pages.
The Catalyst Group Resources™ "Unconventional Catalytic Olefins Production: Commercial Vision and Breakout?", Multi-Client Study Presentation, 19 pages, 2013.
Pullman Kellogg, Introduction to the Process Flow of Foreign Petrochemical Products, Institute of Science and Technology Information, p. 45, Shanghai Science and Technology Literature Press, published in Dec. of 1979, with English translation.

* cited by examiner

NAPHTHA CATALYTIC CRACKING FOR LIGHT OLEFINS PRODUCTION OVER CYCLIC REGENERATIVE PROCESS WITH DRY GAS DILUENT

CROSS REFERENCE TO RELATED APPLICATIONS

This application is a national phase application under 35 U.S.C. § 371 of International Application No. PCT/IB2017/057797 filed Dec. 11, 2017, which claims priority to U.S. Provisional Patent Application No. 62/433,618 filed Dec. 13, 2016. The entire contents of each of the above-referenced disclosures is specifically incorporated by reference herein without disclaimer.

FIELD OF INVENTION

The present invention generally relates to the production of light olefins. More specifically, the present invention relates to the catalytic cracking of liquid hydrocarbons to form light olefins.

BACKGROUND OF THE INVENTION

Distilling crude oil to produce products such as butane (or lighter hydrocarbons), straight run gasoline, naphtha, kerosene, light gas oil, heavy gas oil, and straight run residue is simply separating the crude oil into its various constituents. Thus, under set processing conditions, the relative proportions of the products produced from a particular type of crude oil will roughly remain constant. However, based on market demands, it may be more economical to be able to increase the proportion of one or more of the products at the expense of other products. For example, when the demand for gasoline is high, it may be more economical to produce more gasoline than heavy gas oil. Thus, processes have been developed to convert one type of distilled product to another. One such process is catalytic cracking, where longer and heavier hydrocarbon molecules are contacted with a catalyst at high temperatures and pressures to break them into lighter and shorter hydrocarbon molecules.

Catalytic cracking often involves converting vacuum gas oil to high octane gasoline, light fuels and light olefins. Typically, a liquid oil stream is contacted with a catalyst, in a reactor, under a certain temperature and pressure to cause the oil to crack and produce lighter products. As the cracking reaction occurs, coke, a carbonaceous material, is formed and deposits on the catalyst. As a result of the coke deposits on the catalyst, the catalyst becomes less effective or inactive—that is, the catalyst becomes spent. The spent catalyst is sent to a regenerator where the coke is removed from the catalyst by combusting the coke. The regenerated catalyst is then returned to the reactor.

One type of catalytic cracking process involves the conversion of paraffinic hydrocarbons having end point <350° C. into light olefins (e.g., $C_2$ and $C_3$ hydrocarbons). However, carrying out this conversion with high selectively and high yields poses a challenge from both process configuration and catalyst design standpoints. The conversion of paraffinic hydrocarbons having end point <350° C. into light olefins requires high temperature (above 600° C.) and relatively short residence time to overcome the endothermicity of the reactions and prevent oligomerization of the light olefins. In addition, at such high temperature, catalyst deactivation is problematic; specifically, catalysts in this process deactivate more frequently than some other catalytic processes. Catalyst deactivation is caused by coke formation and structural damage of the catalyst caused, at least in part, by high temperatures.

One commercial process for converting naphtha feed into light olefins was jointly developed by KBR and SK cooperation. The technology is called Advanced Catalytic Olefins (ACO™) and is based on a fluid catalytic cracking process where catalysts are circulated between reactor and regenerator. This process is most applicable when the catalyst deactivates rapidly. The process suffers from heat imbalance when paraffinic feed is used. The amount of coke is not enough to sustain the energy balance. In addition, the process requires high catalyst/oil ratio in order to have acceptable yields and requires continuous catalyst make up as a result of rapid loss of catalyst activity. In the ACO™ process, yields per pass are relatively low compared to a fixed bed process because of the short residence time of the process.

BRIEF SUMMARY OF THE INVENTION

A discovery has been made of a process that addresses the foregoing problems associated with the catalytic cracking of hydrocarbons to form light olefins. Embodiments of the process involve alternately utilizing one of at least two trains of fixed bed reactors to catalytically crack hydrocarbons in a feed mixture that includes the hydrocarbons and dry gas. In this way, a continuous process involving cyclic regeneration of catalyst is provided, where minimal catalyst makeup is required because the dry gas serves as a diluent that minimizes coke formation and reduces catalyst structural damage.

Embodiments of the invention include a method of producing olefins by a catalytic cracking process. The method may include providing a first train of fixed bed reactors and a second train of fixed bed reactors for processing a feed that comprises one or more paraffins. The method may also include alternating between the first train of fixed bed reactors and the second train of fixed bed reactors being in operation in the catalytic cracking process. The train of fixed bed reactors in operation may be adapted to contact the feed with a catalyst under reaction conditions sufficient to produce a reactor effluent that includes a $C_2$ to $C_4$ olefin, dry gas, and liquid hydrocarbons. The dry gas may include one or more of methane, hydrogen, ethane, or propane. The method may also include recovering the $C_2$ to $C_4$ olefin from the reactor effluent. The method may further include recirculating at least some of the methane and hydrogen of the dry gas as part of the feed to the train of fixed bed reactors in operation.

The following includes definitions of various terms and phrases used throughout this specification.

The terms "about" or "approximately" are defined as being close to as understood by one of ordinary skill in the art. In one non-limiting embodiment the terms are defined to be within 10%, preferably, within 5%, more preferably, within 1%, and most preferably, within 0.5%.

The terms "wt. %", "vol. %" or "mol. %" refers to a weight, volume, or molar percentage of a component, respectively, based on the total weight, the total volume, or the total moles of material that includes the component. In a non-limiting example, 10 moles of component in 100 moles of the material is 10 mol. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification, includes any measurable decrease or complete inhibition to achieve a desired result.

The term "effective," as that term is used in the specification and/or claims, means adequate to accomplish a desired, expected, or intended result.

The use of the words "a" or "an" when used in conjunction with the term "comprising," "including," "containing," or "having" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The process of the present invention can "comprise," "consist essentially of," or "consist of" particular ingredients, components, compositions, etc., disclosed throughout the specification.

In the context of the present invention, twenty embodiments are now described. Embodiment 1 is a method of producing olefins by a catalytic cracking process. The method includes the steps of providing a first train of fixed bed reactors and a second train of fixed bed reactors for processing a feed that contains one or more paraffins; alternating between the first train of fixed bed reactors and the second train of fixed bed reactors being in operation in the catalytic cracking process, wherein the train of fixed bed reactors in operation contacts the feed with a catalyst under reaction conditions sufficient to produce a reactor effluent that contains a $C_2$ to $C_4$ olefin, dry gas, and liquid hydrocarbons, the liquid hydrocarbons containing unreacted hydrocarbons from the feed, the dry gas containing one or more of methane, hydrogen, ethane, or propane; recovering the $C_2$ to $C_4$ olefin from the reactor effluent; and recirculating at least some of the methane and hydrogen of the dry gas as part of the feed to the train of fixed bed reactors in operation. Embodiment 2 is the method of embodiment, wherein the one or more paraffins have an end point of less than 350° C. Embodiment 3 is the method of any of embodiments 1 and 2, wherein the feed is selected from the list consisting of: light naphtha, heavy naphtha, kerosene, and combinations thereof. Embodiment 4 is the method of any of embodiments 1 to 3, wherein the alternating includes: when the first train of fixed bed reactors is in operation, the second train of fixed bed reactors is being regenerated or is on standby, ready to be put in operation when the first train of fixed bed reactors is taken out of operation, and vice versa. Embodiment 5 is the method of any of embodiments 1 to 4, wherein a time for the alternating is determined by the condition of the catalyst of the train of fixed bed reactors in operation. Embodiment 6 is the method of any of embodiments 1 to 5, wherein catalyst beds of each of the trains of fixed bed reactors can be one type of catalyst to three different types of catalyst. Embodiment 7 is the method of any of embodiments 1 to 6, wherein the catalyst contains a zeolite based catalyst having medium pore size of 10-ring or large pore size pore of 12-ring. Embodiment 8 is the method of embodiment 7, wherein the zeolite based catalyst having medium pore size contains a catalyst selected from the list consisting of: MFI, MEL, MTT, MRE, MWW, FER, CGS, SVR and STW. Embodiment 9 is the method of embodiment 7, wherein the zeolite based catalyst having large pore size contains a catalyst selected from the list consisting of: MOR, FAU, BOG, MTW, MAZ, OFF, BEA, MEI, LTL, and GME. Embodiment 10 is the method of any of embodiments 7 to 9, wherein the zeolite based catalyst contains a selection from the list consisting of: 60 wt. % zeolite, phosphorous, alkaline, alkaline earth metals, transition metals, rare earth metals, binder, filler, matrix component, and combinations thereof. Embodiment 11 is the method of any of embodiments 1 to 10, wherein the reactor temperature range is in a range from 450 to 900° C., preferably from 530 to 800° C. and more preferably from 580 to 750° C. Embodiment 12 is the method of any of embodiments 1 to 11, wherein, the reactor temperature is a temperature above 450° C. Embodiment 13 is the method of any of embodiments 1 to 12, wherein the reactor pressure range is from vacuum to 10 bars, preferably from vacuum to 5 bars. Embodiment 14 is the method of any of embodiments 1 to 13, wherein the reactor WHSV range is from 1 to 80 $hr^{-1}$, preferably from 2 to 70 $hr^{-1}$ and more preferably from 4 to 50 $hr^{-1}$. Embodiment 15 is the method of any of embodiments 1 to 14, wherein each of the trains of fixed bed reactors can have from one reactor to seven reactors. Embodiment 16 is the method of any of embodiments 1 to 15, wherein the feed contains a dry gas/hydrocarbon feed ratio in the range 0 to 10 by wt., preferably from 0 to 5 by wt. Embodiment 17 is the method of any of embodiments 1 to 16, wherein the dry gas primarily contains methane and/or hydrogen. Embodiment 18 is the method of any of embodiments 1 to 17, wherein the dry gas further contains ethylene and/or ethane. Embodiment 19 is the method of embodiment 1 to 18, wherein the dry gas contains less than 0.5 wt. % ethylene. Embodiment 20 is the method of any of embodiments 1 to 19, wherein when the first reactor train or second reactor train contains a plurality of reactors, the plurality of reactors are in series in the first reactor train or second reactor train.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

For a more complete understanding, reference is now made to the following descriptions taken in conjunction with the accompanying drawings, in which.

DETAILED DESCRIPTION OF THE INVENTION

A discovery has been made of a process that addresses the current problems associated with catalyst cracking of hydrocarbons to produce light olefins. The process includes the use of two or more trains of reactors arranged in parallel to ensure a continuous mode of operation, including during catalyst regeneration. The process further includes using dry gas to dilute the hydrocarbon feed to protect catalyst activity.

Embodiments of the process produces light olefins from liquid hydrocarbons using a cyclic regenerative process (cyclic fixed bed reactors configuration) where the liquid hydrocarbon feed is introduced to a first train of fixed bed reactors for catalytic cracking while a second train of fixed bed reactors is in a standby mode or is in the process of having its catalyst regenerated. The liquid hydrocarbon feed, in embodiments, may be diluted with dry gas. The dry gas may be recycled from the effluent of the catalytic cracking process. In embodiments of the process, liquid hydrocarbon feed has an end point <350° C. The discovered process requires minimal catalyst makeup because the dry gas serves as a diluent, which minimizes coke formation and reduces catalyst structural damage.

Figure 1:
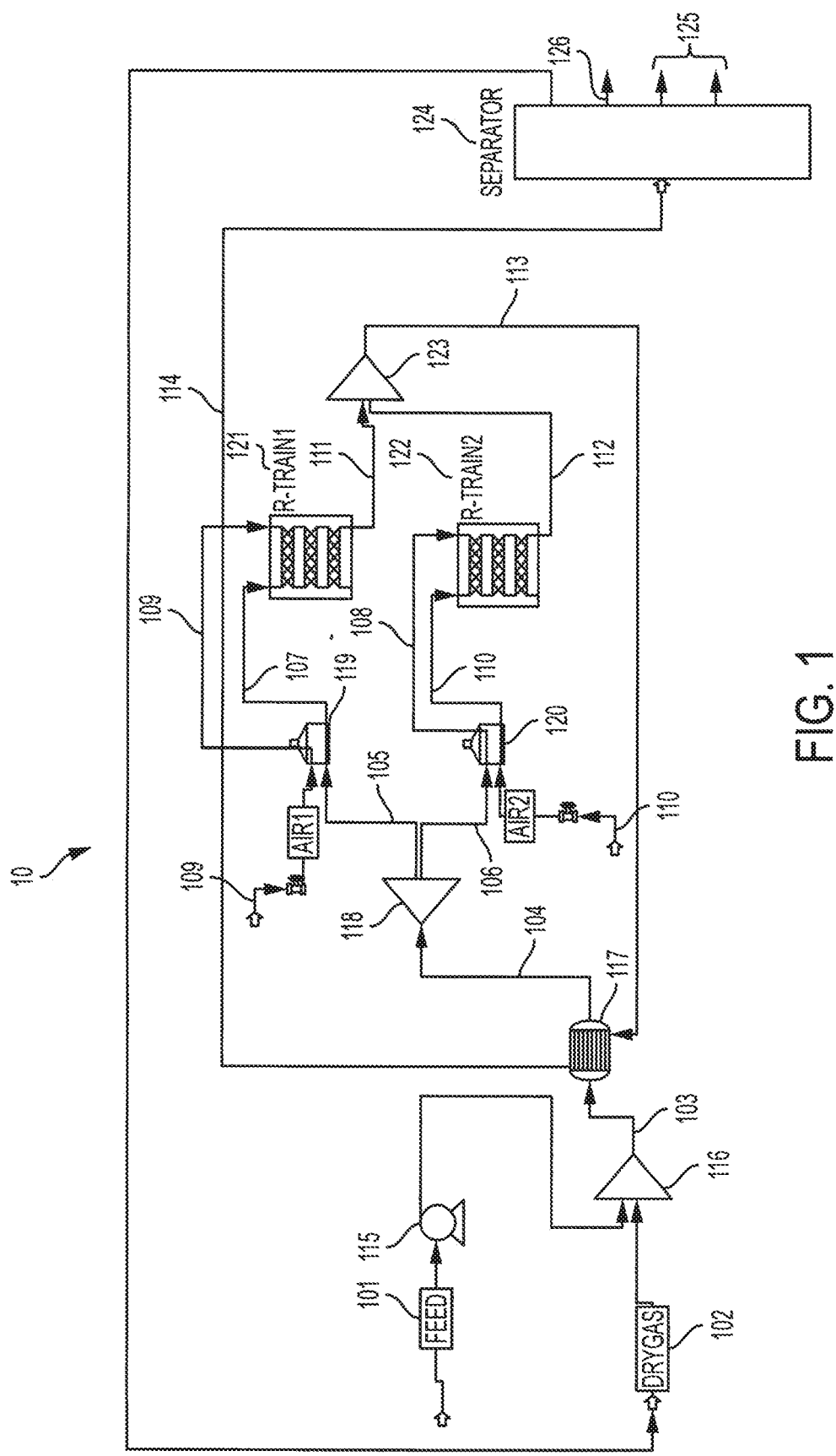
FIG. 1 shows a system for producing olefins by a catalytic cracking process, according to embodiments of the invention.

FIG. 1 shows system 10 for producing olefins by a catalytic cracking process, according to embodiments of the invention. In operation, hydrocarbon feed 101 may be supplied to system 10 from other refinery processes such as distillation processes. Hydrocarbon feed 101 may include one or more liquid streams of light naphtha, heavy naphtha, kerosene, diesel or combinations thereof. Hydrocarbon feed 101 may comprise primarily paraffins.

In embodiments of the invention, in addition to hydrocarbon feed 101, dry gas feed 102 may be supplied to system 10. In embodiments of the invention, dry gas feed 102 may originate from other refinery processes. As shown in FIG. 1, however, dry gas feed 102 is a recycled stream from the catalytic cracking process carried out by system 10. In embodiments of the invention, such as system 10, where dry gas feed is a byproduct of the catalytic cracking reaction, the need to import dry gas from elsewhere and the cost associated with such importation are avoided. In embodiments of the invention, dry gas feed 102 may be a combination of dry gas from another refinery process and dry gas from the catalytic cracking process. In embodiments of the invention dry gas feed 102 may include one or more of methane, ethane, hydrogen, propane, or ethylene. Dry gas feed 102 may include primarily methane. Dry gas feed 102 may include primarily methane and hydrogen. In embodiments of the invention, dry gas feed 102 may include less than 0.5 wt. % ethylene.

Pump 115 pumps hydrocarbon feed 101 to mixer 116 where it mixes with the dry feed 102 to form combined feed stream 103. In embodiments of the invention, combined feed stream 103 includes a dry gas/hydrocarbon feed ratio by weight in the range 0 to 10, and all ranges and values there between including 0, 1, 2, 3, 4, 5, 6, 7, 8, 9, and 10, preferably from 0 to 5 and more preferably from 0.1 to 3. In this way, dry gas feed 102 dilutes hydrocarbon feed 101. Diluting hydrocarbon feed 101 in this way minimizes coke formation in the catalytic cracking process, reduces catalyst structure damage, and allows the catalyst to be subjected to more favorable conditions for catalytic activity.

Overall, hydrocarbon feed 101, which is supplied to system 10 is diluted to form combined feed stream 103, which is heated to form heated feed stream 104, which are channeled as heated feed stream 105 or heated feed stream 106, which are then heated to form heated feed stream 107 or heated feed stream 108, which are fed to reactor train 121 and reactor train 122, respectively, depending on which reactor train is in operation. Diluting hydrocarbon feed 101 in this way to supply reactor train 121 and reactor train 122 reduces coke formation rate in reactor train 121 and reactor train 122 by operating at controlled hydrocarbon partial pressure. Further, by using dry gas feed 102 to carry out the dilution avoids the use of steam for that purpose and thereby avoids catalyst structural damage by steam diluent. Because catalyst structural damage may be avoided in embodiments of the invention where dry gas is used as feed diluent, no fresh catalyst is needed to be added to the reactors to maintain product yield.

Combined feed stream 103 may be preheated in heat exchanger 117. As shown in FIG. 1, system 10 utilizes reactor effluent 113 to heat combined feed stream 103. In embodiments of the invention, combined feed stream 103 is heated to a temperature in the range 25 to 350° C. to form heated feed stream 104. Splitter 118 may direct heated feed stream 104 as heated feed stream 105 or heated feed stream 106, towards the reactor system, depending on which of reactor train 121 (R-TRAIN1) and reactor train 122 (R-TRAIN2) is in operation.

When reactor train 121 is in operation, heated feed stream 105 may be heated further by heater 119 to form heated feed stream 107. Heated feed stream 107 is then routed to reactor train 121. Heated feed stream 107 may have a temperature in the range of 500 to 750° C. and a pressure in the range of 1 to 5 bars when entering reactor train 121. Reactor train 121 catalytically cracks hydrocarbons of heated feed stream 107 to form reactor effluent 111, which may comprise light olefins such as $C_2$ to $C_4$ olefins, dry gas, and other hydrocarbons. The reactor train may have up to 7 reactors connected in series or parallel or a combination of both configurations. In embodiments of the invention, a fired furnace exists between each reactor. In embodiments of the invention, reactor effluent 111 may include one or more of methane, hydrogen, ethane, or propane. Reactor effluent 111 may be channeled by element 123 as reactor effluent 113, towards heat exchanger 117.

In embodiments of the invention, while reactor train 121 is in operation, reactor train 122 is having its catalyst regenerated or is on standby. The catalyst of reactor train 122 may be regenerated by passing air stream 110 to heater 120, where air stream 110 may be heated. After being heated, air stream 110 may be flowed through each reactor of reactor train 122 burn off the carbon deposits (coke) that are on the catalysts in the reactors. According to embodiments of the invention, air stream 110 is flowed to reactor train 122 only when the catalyst of reactor train 122 is being regenerated. After completing the regeneration process, reactor train 122 may be placed on standby. Eventually, reactor train 122 is put back in operation when reactor train 121 is taken out of service to have the catalyst of reactor train 121 regenerated. In embodiments of the invention, a time for the alternating between reactor train 121 and reactor train 122 is determined by the condition of the catalyst of whichever of reactor train 121 and reactor train 122 is in operation.

When reactor train 122 is in operation, heated feed stream 106 may be further heated by heater 120 to form heated feed stream 108. Heated feed stream 108 is then routed to reactor train 122. Heated feed stream 108 may have a temperature in the range of 500 to 750° C. and a pressure in the range of 1 to 5 bars when entering reactor train 122. Reactor train 122 catalytically cracks hydrocarbons of heated feed stream 108 to form reactor effluent 112, which may comprise light olefins such as $C_2$ to $C_4$ olefins, dry gas, and other hydrocarbons. The reactor train may have up to 7 reactors connected in series or parallel or a combination of both configurations. In embodiments of the invention, a fired furnace exists between each reactor. In embodiments of the invention, reactor effluent 112 may include one or more of methane, hydrogen, ethane, or propane. Reactor effluent 112 may be channeled by element 123 as reactor effluent 113, towards heat exchanger 117.

In embodiments of the invention, while reactor train 122 is having its catalyst regenerated or is on standby. The catalyst of reactor train 121 may be regenerated by passing air stream 109 to heater 119, where air stream 109 may be heated. After heating, air stream 109 may be flowed through each reactor of reactor train 121 to burn off the carbon deposits (coke) on the catalysts in the reactors. According to embodiments of the invention, air stream 109 is flowed to reactor train 121 only when the catalyst of reactor train 121 is being regenerated. After completing the regeneration process, reactor train 121 may be placed on standby. Eventually, reactor train 121 is put back in operation when reactor train 122 is taken out of service to have catalyst of reactor train 122 regenerated.

In summary, the cyclic regenerative process implemented by system 10, according to embodiments of the invention, provides a catalytic cracking operation that is alternated between reactor train 121 and reactor train 122. Thus, when reactor train 121 is catalytically cracking hydrocarbons to produce light olefins and other products, reactor train 122 is being regenerated or is on standby and vice versa. On standby, reactor train 122 is ready to be put in operation when reactor train 121 needs to be taken out of operation and vice versa. When reactor train 121 is taken out of operation, reactor train 122 may be immediately put into operation and vice versa.

It should be noted that, in embodiments of the invention, system 10 could have more than two trains of reactors, e.g., system 10 could have two, three, four, five, six or seven trains of reactors. Each of reactor train 121 and reactor train 122 may have one or more reactors. For example, each of reactor train 121 and reactor train 122 may each have one, two, three, four, five, six, or seven reactors. When reactor train 121 or reactor train 122 has a plurality of reactors, the reactors may be arranged in series or parallel, or combinations thereof, within the respective reactor train.

In embodiments of the invention, the catalyst used in reactor train 121 and reactor train 122 include a zeolite based catalyst having medium pore size such as one or more of: MFI, MEL, MTT, *MRE, MWW, FER, CGS, SVR, or STW. Further, in embodiments of the invention, the catalyst used in reactor train 121 and reactor train 122 include zeolite based catalyst having large pore size such as one or more of: MOR, FAU, BOG, MTW, MAZ, OFF, *BEA, MEI, LTL, or GME. The medium pore size zeolite catalyst may have 10-ring pores and the large pore size zeolite catalyst may have 12-ring pores. In embodiments of the invention, the catalyst used in reactor train 121 and reactor train 122 may include a zeolite based catalyst that comprises one or more of: phosphorous, alkaline, alkaline earth metals, transition metals, or rare earth metals. In embodiments of the invention, the catalyst beds of each of reactor train 121 and reactor train 122 can have a plurality of different catalysts. For example, reactor train 121 and reactor train 122 may each have one, two, or three different catalysts. Different reactors in reactor train 121 and reactor train 122 may have different catalysts.

In embodiments of the invention, the zeolite based catalyst used in reactor train 121 and reactor train 122 contains zeolite, filler, binder, promotors and matrix components. The final cracking catalyst may contain up to 60 wt. % of zeolite.

In embodiments of the invention, the reaction conditions sufficient to produce reactor effluent 111 and reactor effluent 112 may include one or more reactors of reactor train 121 and reactor train 122 having a reactor temperature above 450° C. In embodiments of the invention, the reaction conditions sufficient to produce reactor effluent 111 or reactor effluent 112 may include one or more reactors of reactor train 121 and reactor train 122 having a reactor temperature in the range from 450 to 900° C., and all ranges and values there between including 450° C. to 500° C., 500° C. to 550° C., 550° C. to 600° C., 600° C. to 650° C., 650° C. to 700° C., 700° C. to 750° C., 750° C. to 800° C., 800° C. to 850° C., and 850° C. to 900° C., preferably from 530° C. to 800° C., and more preferably from 580° C. to 750° C.

In embodiments of the invention, the reaction conditions sufficient to produce reactor effluent 111 and reactor effluent 112 may include one or more reactors of reactor train 121 and reactor train 122 having a reactor pressure in the range from vacuum to 10 bars, and all ranges and values there between including vacuum, 1 bars, 2, bars, 3 bars, 4 bars, 5 bars, 6 bars, 7 bars, 8 bars, 9 bars, and 10 bars, preferably from vacuum to 5 bars.

In embodiments of the invention, the reaction conditions sufficient to produce reactor effluent 111 and reactor effluent 112 may include one or more reactors of reactor train 121 or reactor train 122 having a reactor WHSV range is from 1 to 80 $hr^{-1}$, and all ranges and values there between including 1 $hr^{-1}$ to 5 $hr^{-1}$, 5 $hr^{-1}$ to 10 $hr^{-1}$, 10 $hr^{-1}$ to 15 $hr^{-1}$, 15 $hr^{-1}$ to 20 $hr^{-1}$, 20 $hr^{-1}$ to 30 $hr^{-1}$, 30 $hr^{-1}$ to 40 $hr^{-1}$, 40 $hr^{-1}$ to 50 $hr^{-1}$, 50 $hr^{-1}$ to 60 $hr^{-1}$, 60 $hr^{-1}$ to 70 $hr^{-1}$, and 70 $hr^{-1}$ to 80 $hr^{-1}$, preferably from 2 to 70 $hr^{-1}$, preferably from 5 to 55 $hr^{-1}$, and more preferably from 5 to 50 $hr^{-1}$.

Reactor effluent 111 and 112 may be routed, as reactor effluent 113, to heat exchanger 117 where reactor effluent 113 is cooled and combined feed stream 103 is heated. Reactor effluent 113 is cooled to form cooled reactor effluent stream 114, which may be routed to separator 124 for separation into a variety of targeted products such as light olefins 126 (e.g., $C_2$ to $C_4$ olefins), dry gas feed 102, and other hydrocarbons 125. Separator 124 may include a series of separation equipment. Unconverted feed of other hydrocarbons 125 can be recycled back with hydrocarbon feed 101 to reactor train 121 and reactor train 122 for further conversion.

Although embodiments of the present invention have been described with reference to processes implemented by system 10 as shown in FIG. 1, it should be appreciated that embodiments of the present invention may not be limited to those particular processes and/or the particular order of the processes described with respect to system 10. Accordingly, embodiments of the invention may provide functionality as described herein where some processes are not included or replaced by equivalent processes to those described with respect to system 10.

Figure 2:
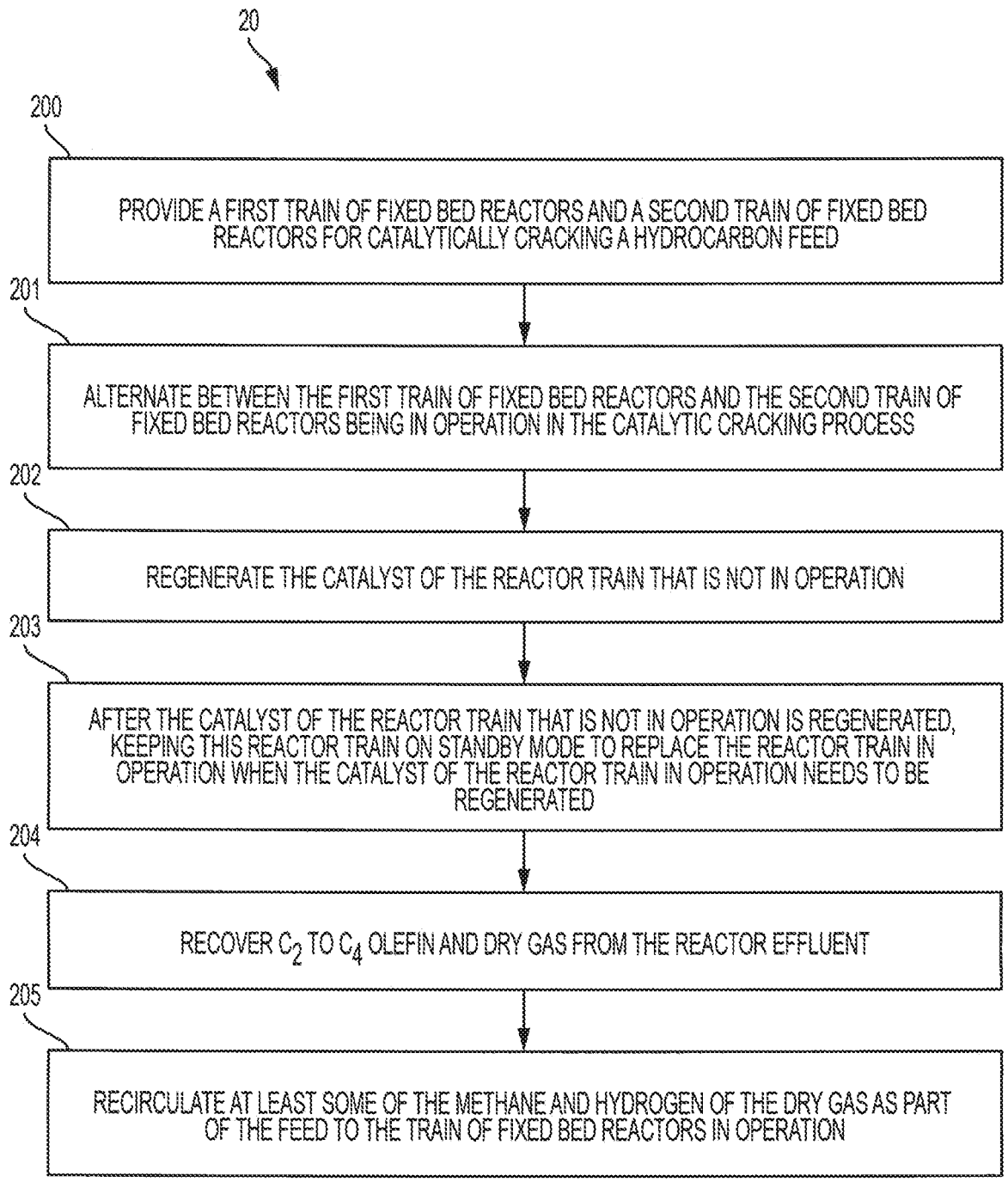
FIG. 2 shows a method of producing olefins by a catalytic cracking process, according to embodiments of the invention.

FIG. 2 shows method 20 for producing olefins by a catalytic cracking process, according to embodiments of the invention. Method 20 may begin at block 200, which involves providing a first train of fixed bed reactors (e.g., reactor train 121, FIG. 1) and a second train of fixed bed reactors (e.g., reactor train 122, FIG. 1) for processing a hydrocarbon feed (e.g., hydrocarbon feed 101, FIG. 1). Hydrocarbon feed 101 may include one or more paraffins. Method 20 may also include, at block 201, alternating between reactor train 121 and reactor train 122 being in operation in the catalytic cracking process. Whichever of reactor train 121 and reactor train 122 that is in operation contacts hydrocarbon feed 101 (as part of heated feed stream 107 and heated feed stream 108) with a catalyst under reaction conditions sufficient to produce a reactor effluent 111 or reactor effluent 112 that includes one or more $C_2$ to $C_4$ olefins, dry gas, and liquid hydrocarbons (including unreacted hydrocarbons of the feed). The dry gas may include one or more of methane, hydrogen, ethane, or propane. Method 20 may further include, at block 202, regenerating the catalyst that is not in operation. Block 203 includes, after the catalyst of the reactor train that is not in operation is regenerated, keeping the regenerated reactor train on standby mode to replace the reactor train in operation when the reactor train in operation needs regenerating. Block 204 involves recovering the one or more $C_2$ to $C_4$ olefins from the reactor effluent. Then, block 205 includes recirculating at least some of the methane and hydrogen of the dry gas as part of feed to whichever of reactor train 121 and reactor train 122 that is in operation.

EXAMPLES

Example 1

In Example 1, a test was carried out in which naphtha was cracked catalytically over fixed bed reactor and fluidized bed reactor pilot plant. The naphtha feed had the following composition (Table 1):

TABLE 1

| Light Naphtha Composition Feed (LSRN) | |
|---|---|
| N-C5 | 28.8 |
| I-C5 | 11.8 |
| Cycl-C5 | 1.9 |
| N-C6 | 24.5 |
| I-C6 | 26.9 |
| Cycl-C6 | 4.6 |
| Benzene | 1.3 |
| C7 | 0.3 |
| sum | 100 |

In Example 1, a catalyst was tested for light naphtha cracking using fixed bed reactor and fluidized bed pilot plant. Reactor temperature, flow rate and steam rate are provided in Table 2. Residence time of the fixed bed and the fluidized bed pilot plant was 10 minutes and less than a minute, respectively. The fixed bed had the flexibility to vary the residence time unlike fluid catalytic cracking (FCC) type process, where the residence time was limited to below a minute. As can be seen, in Table 2, the yield toward light olefin is higher by approximately 10% when a fixed bed is used.

TABLE 2

| Light Naphtha Cracking Over Fixed And Fluidized Reactors | | |
|---|---|---|
| | Reactor Type | |
| | Fluidized pilot plant | Fixed-Bed |
| Temperature, C. | 675 | 650 |
| Naphtha, g/h | 240 | 4 |
| Steam, g/h | 60 | 2 |
| Steam, wt % | 25 | 50 |
| Mass Balance | 96 | 98 |
| Conversion, % | 67.7 | 77.5 |
| Yields, wt % | | |
| $C_3^= + C_2^=$ | 34.2 | 44.5 |
| $C_3^=$ | 18.9 | 26.5 |
| $C_2^=$ | 15.3 | 18.1 |
| $C_3^=/C_2^=$ | 1.2 | 1.5 |
| $C_4^=$ | 9.9 | 6.5 |
| $C_5^=$ | | 1.2 |
| BTX | | 1.8 |
| $C_1$-$C_4$ alkanes | 23.6 | 23.5 |
| $C_1$ | 9.1 | 6 |
| $C_2$ | 8.4 | 8.3 |
| $C_3$ | 4.4 | 7.7 |
| $C_4$ | 1.7 | 1.5 |
| $C_5^+$ | 29.1 | 21.4 |
| Others | 2.1 | 0.3 |
| $H_2$ | 0.6 | 0.7 |
| Total | 99.4 | 100 |

Example 2

Impact of Methane as a Dry Gas and Diluent

In Example 2, the light naphtha feed was cracked in the absence of steam in a fixed bed reactor. The reaction was at a temperature of 650° C., a pressure of 3 bars, and a WHSV of 40 $hr^{-1}$. The catalyst used was a modified ZSM-5 mixed with binder and filler.

The product yields of light olefins and aromatics were 37 wt. % and 6 wt. %. The yields of methane, ethane and propane were 3.4 wt. %, 4.6 wt. %, and 7 wt. %, respectively. The unconverted feed was 40 wt. %. The remaining portions were naphthene and higher olefins.

Example 3

Time On Stream

Figure 3:
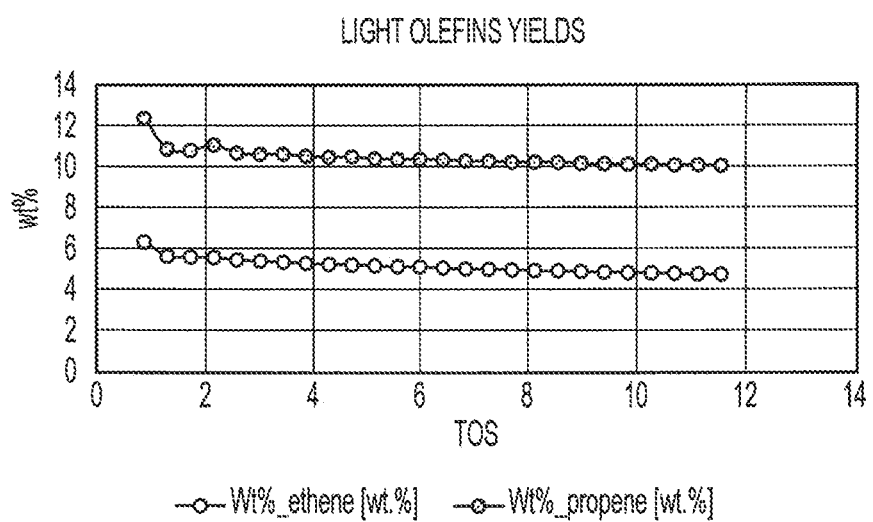
FIG. 3 shows a graph of ethylene and propylene yields as a function of time on stream in the catalytic cracking of light naphtha in the absence of steam in a fixed bed reactor.

In Example 3, the light naphtha feed was cracked in the absence of steam in a fixed bed reactor at a temperature of 600° C., a pressure of 4 bars, and WHSV of 40 $hr^{-1}$. The catalyst contained less than 35 wt. % zeolite. The products yields were recorded at different time on stream. The ethylene and propylene yields are shown in FIG. 3, which show substantially constant or constant values over the 11 hours recorded.

Example 4

Catalyst Stability Experiment

Figure 4:
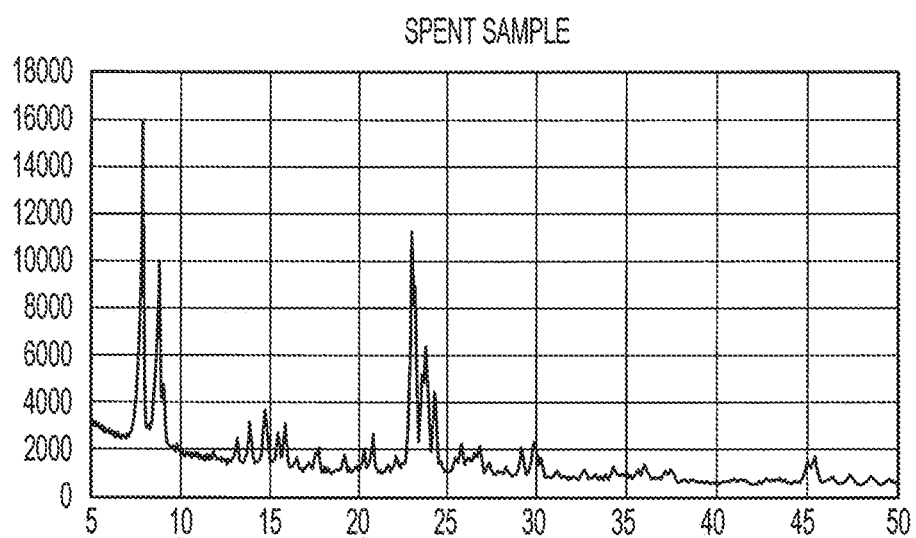
FIG. 4 shows X-ray diffraction (XRD) spectrum of zeolite catalyst after three cycles.

In Example 4, the catalyst stability was evaluated using X-ray diffraction (XRD) equipment. The catalyst was used for the cracking reaction then regenerated after it was deactivated. This completed one cycle. FIG. 4 shows the XRD spectrum of the zeolite catalyst after three cycles (where one cycle is: reaction then regeneration). The reaction temperature was 650° C. and the regeneration was conducted at 550° C. The catalyst maintained its crystallinity when compared to fresh catalyst. This indicates that the catalyst structure is maintained and no sign of structure damage was observed.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method of producing olefins by a catalytic cracking process, the method comprising:
   providing a feed stream comprising primarily paraffins having an end point of less than 350° C.;
   providing a first train of fixed bed reactors and a second train of fixed bed reactors for processing a heated feed stream;
   alternating between the first train of fixed bed reactors and the second train of fixed bed reactors being in operation in the catalytic cracking process, wherein the train of fixed bed reactors in operation contacts the feed with a catalyst under reaction conditions sufficient to produce a reactor effluent that comprises $C_2$ to $C_4$ olefin, the dry gas, and liquid hydrocarbons, the liquid hydrocarbons comprising unreacted hydrocarbons from the feed, wherein the dry gas comprises methane and hydrogen;
   recovering the $C_2$ to $C_4$ olefin from the reactor effluent; and
   recirculating at least some of the methane and hydrogen of the dry gas as part of the feed to form a combined feed;
   preheating the combined feed to a temperature in the range 25 to 350° C. to form the heated feed stream;
   wherein the reaction conditions include a reactor temperature in a range of from 530 to 900° C., wherein the reactor pressure range is from vacuum to 10 bars;
   wherein the catalyst comprises a zeolite based catalyst;
   wherein the feed is selected from the group consisting of light naphtha, heavy naphtha and kerosene, and combinations thereof; and
   wherein the feed comprises a dry gas/hydrocarbon feed ratio in the range 0.1 to 10 by wt.

2. The method of claim 1, wherein the feed comprises light naphtha.

3. The method of claim 1, wherein the feed comprises heavy naphtha.

4. The method of claim 1, wherein feed comprises kerosene.

5. The method of claim 1, wherein the feed is selected from the group consisting of kerosene and light naphtha.

6. The method of claim 1, wherein the feed is selected from the group consisting of kerosene and light naphtha, and wherein the dry gas primarily comprises at least one member selected from the group consisting of methane and hydrogen.

7. A method of producing olefins by a catalytic cracking process, the method comprising:
   providing a first train of fixed bed reactors and a second train of fixed bed reactors for processing a feed that comprises paraffins having an end point of less than 350° C.;
   alternating between the first train of fixed bed reactors and the second train of fixed bed reactors being in operation in the catalytic cracking process, wherein the train of fixed bed reactors in operation contacts the feed with a zeolite-based catalyst under reaction conditions sufficient to produce a reactor effluent that comprises a $C_2$ to $C_4$ olefin, dry gas, and liquid hydrocarbons, the liquid hydrocarbons comprising unreacted hydrocarbons from the feed, the dry gas comprising one or more of methane, hydrogen, ethane, or propane;
   recovering the $C_2$ to $C_4$ olefin from the reactor effluent; and
   recirculating at least some of the methane and hydrogen of the dry gas as part of the feed to the train of fixed bed reactors in operation,
   wherein the reaction conditions include a reactor temperature range in a range of from 530 to 900° C.;
   wherein the WHSV of the reactor is from 1 $hr^{-1}$ to 20 $hr^{-1}$; and
   wherein the feed comprises a dry gas/hydrocarbon feed ratio in the range 0.1 to 10 by wt.

8. The method of claim 1, wherein the catalyst comprises MTW.

9. The method of claim 1, wherein the catalyst comprises MAZ.

10. The method of claim 1, wherein the catalyst comprises OFF.

11. The method of claim 1, wherein the catalyst comprises MEI.

12. A method of producing olefins by a catalytic cracking process, the method comprising:
   providing a first train of fixed bed reactors and a second train of fixed bed reactors for processing a feed that comprises one or more paraffins;
   alternating between the first train of fixed bed reactors and the second train of fixed bed reactors being in operation in the catalytic cracking process, wherein the train of fixed bed reactors in operation contacts the feed with a zeolite catalyst under reaction conditions sufficient to produce a reactor effluent that comprises a $C_2$ to $C_4$ olefin, dry gas, and liquid hydrocarbons, the liquid hydrocarbons comprising unreacted hydrocarbons from the feed, the dry gas comprising one or more of methane, hydrogen, ethane, or propane;
   recovering the $C_2$ to $C_4$ olefin from the reactor effluent; and
   recirculating at least some of the methane and hydrogen of the dry gas as part of the feed to the train of fixed bed reactors in operation, wherein the catalyst consists of 60 wt. % of a zeolite selected from the group consisting of MTW, MAZ, OFF, MEI, LTL, GME, MTT, MRE, MWW, FER, SVR and STW; and
at least one member selected from the group consisting of phosphorous, alkaline, alkaline earth metals, transition metals, rare earth metals, binder, and a matrix component;
wherein the reaction conditions include a reactor temperature range in a range of from 530 to 900° C.; and wherein the dry gas comprises less than 0.5 wt. % ethylene; and where in the feed comprises a dry gas/hydrocarbon feed ratio in the range 0.1 to 10 by wt.

13. The method of claim 1, wherein the catalyst comprises LTL.

14. The method of claim 1, wherein the catalyst comprises GME.

15. The method of claim 1, wherein the catalyst comprises MTT.

16. The method of claim 1, wherein the catalyst comprises MRE.

17. The method of claim 1, wherein the catalyst comprises MWW.

18. The method of claim 1, wherein the catalyst comprises FER.

19. The method of claim 1, wherein the catalyst comprises SVR.

20. The method of claim 1, wherein the catalyst comprises STW.

* * * * *